(12) United States Patent
Ballakur et al.

(10) Patent No.: US 9,906,324 B2
(45) Date of Patent: Feb. 27, 2018

(54) METHOD AND APPARATUS FOR SELECTIVE COMMUNICATION SIGNAL DECIPHERING

(71) Applicant: Telefonaktiebolaget LM Ericsson (publ), Stockholm (SE)

(72) Inventors: Ravitej Ballakur, Bangalore (IN); Sajal Kumar Das, Bangalore (IN); Suyog Moogi, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 617 days.

(21) Appl. No.: 13/740,538

(22) Filed: Jan. 14, 2013

(65) Prior Publication Data
US 2014/0198915 A1 Jul. 17, 2014

(51) Int. Cl.
| | |
|---|---|
| *H04L 29/06* | (2006.01) |
| *H04K 1/00* | (2006.01) |
| *H04L 9/08* | (2006.01) |
| *H04W 12/06* | (2009.01) |
| *H04W 12/04* | (2009.01) |
| *H04W 12/02* | (2009.01) |

(52) U.S. Cl.
CPC ............. *H04K 1/00* (2013.01); *H04L 9/08* (2013.01); *H04L 63/0428* (2013.01); *H04W 12/02* (2013.01); *H04W 12/04* (2013.01); *H04W 12/06* (2013.01)

(58) Field of Classification Search
CPC ..... H04W 12/02; H04W 12/06; H04W 12/04; H04L 63/0428; H04L 9/08; H04K 1/00

USPC ........................................................ 380/270
See application file for complete search history.

(56) References Cited

U.S. PATENT DOCUMENTS

| | | | |
|---|---|---|---|
| 8,165,618 B1 * | 4/2012 | Hole .................... | H04W 12/02 370/509 |
| 2003/0095507 A1 | 5/2003 | Chen et al. | |
| 2012/0093314 A1 * | 4/2012 | Jokinen ............... | H04L 63/0457 380/270 |
| 2012/0137125 A1 * | 5/2012 | Dhanda et al. ............... 713/153 | |
| 2012/0213373 A1 | 8/2012 | Xin et al. | |

(Continued)

OTHER PUBLICATIONS

3rd Generation Partnership Project; Technical Specification Group GSM/EDGE Radio Access Network; Mobile Radio Interface Layer 3 Specification; Radio Resource Control (RRC) Protocol (Release 11); 3GPP TS 44.018 V11.1.0; May 2012. p. 202.

(Continued)

*Primary Examiner* — Mahfuzur Rahman
*Assistant Examiner* — Narciso Victoria
(74) *Attorney, Agent, or Firm* — Patent Portfolio Builders, PLLC

(57) ABSTRACT

Selective deciphering of a received signal, as taught herein, provides a number of advantages, including greater efficiency through the elimination or at least reduction of wasted decoding cycles. The technique, such as practiced in a user equipment or other wireless communication device, capitalizes on the advantageous recognition herein that the demodulation results obtained for at least some types of received data blocks may be inspected or otherwise evaluated for characteristic patterns that are indicative of whether the data block was or was not ciphered for transmission. That evaluation informs the selective deciphering decision.

15 Claims, 8 Drawing Sheets

(56) References Cited

U.S. PATENT DOCUMENTS

2013/0058485 A1* 3/2013 Xin et al. .................. 380/270
2013/0225157 A1* 8/2013 Sikri et al. .................. 455/423

OTHER PUBLICATIONS

3rd Generation Partnership Project; 3GPP TSG-GERAN Meeting #47, GP-101242; Kunming, China, Sep. 3, 2010; pp. 1-5.
3rd Generation Partnership Project; 3GPP TSG-GERAN #51, GP-111233; Gothenburg, Sweden, Sep. 2, 2011; pp. 1-11.

* cited by examiner

| SACCH Message Contains | SACCH 23 bytes information bits (184 bits passed to Physical layer for encoding, interleaving and ciphering process) | Demodulated soft bit array (locations) in the MS receiver |
|---|---|---|
| (2) System Information [SAPI-0] data pattern in the message content | [2-bytes of L1 header]-0-00-000-11-000X-00-11-******** Total 184 input bits to BTS PHY layer, which is encoded, interleaved and not ciphered and then transmitted. | Soft bit [44] = 0 or positive value<br>Soft bit [130] = 1 or negative value<br>Soft bit [144] = 0 or positive value<br>Soft bit [197] = 1 or negative value<br>Soft bit [244] = 0 or positive value<br>Soft bit [297] = 1 or negative value<br>Soft bit [346] = 1 or negative value<br>Soft bit [395] = 0 or positive value<br>Soft bit [446] = 1 or negative value |

*PRIOR ART*
*FIG. 3*

| SACCH (with SI indication - any SI 5, 5ter, 5bits, 6,) RSSI Power Level (Channel type Static) | Detection Percentage (soft bits match) |
|---|---|
| -105 dBm [SNR = 6 dB] | All nine soft bit signs value matches (100% detection of the presence of SI) |
| -110 dBm [SNR = 1 dB] | 90% detection |

*FIG. 8*

METHOD AND APPARATUS FOR SELECTIVE COMMUNICATION SIGNAL DECIPHERING

TECHNICAL FIELD

The present invention generally relates to communication systems, and particularly relates to selective deciphering of received communications signals.

BACKGROUND

The use of ciphering to transmit at least some of the information conveyed over the air interfaces in wireless communication networks is well known. For example, networks based on the Global System for Mobile communications (GSM) support a number of different encryption techniques, known as "A5/1", "A5/3" and "A5/4", to cipher data at Layer 1 on the radio interface. Such operations are described in the Third Generation Partnership Project (3GPP) Technical Specification identified as TS 43.020 V9.1.0 (2009-12-18), which is incorporated by reference herein. Among the various encryption techniques, A5/1 encryption is the most commonly used encryption technique for GSM, and support for A5/1 has been mandatory for all GSM mobile devices since GSM Release-1999.

However, it was realized that certain aspects of overall GSM network operation resulted in security risks arising from the transmission of ciphered text. For example, according to the GSM specifications, certain information was transmitted as ciphered text and also as unciphered or "clear" text.

The document 3GPP GERAN#47 (GP-101243, GP-101242) identifies a particular instance of this problem. In this regard, it may be helpful to note that GSM base stations continuously forward information about their current system configuration and other information needed by wireless devices before such devices are allowed to access the network. These various items of information are organized into six different system information (SI) words containing specific parameters. For example, Type 1 to Type 4 SI words are transmitted within the BCCH (broadcast control channel). Type 5 and Type 6 SI words are only transmitted during an established individual radio link in the downlink direction in a multiplexed service channel—i.e., the Slow Associated Control Channel (SACCH).

As regards the security problem identified in 3GPP GERAN#47 (GP-101243, GP-101242), it is noted that certain SI is sent in ciphered form on the SACCH and that the encryption key used for ciphering on the SACCH is the same key used for encrypting data on the associated traffic channel carrying voice or data to a network user. The same SI is sent as clear text on a broadcast channel, and thus can be received by any GSM receiver within range of the transmission.

Consequently, an eavesdropper could receive the ciphered transmission on the SACCH and receive the unciphered transmission on the broadcast channel. Having both transmissions and knowing that the system information in the ciphered transmission was identical to that in the unciphered transmission, the eavesdropper could work backward mathematically to derive the encryption key used for ciphering. The encryption key would then allow the eavesdropper to intercept and decrypt user traffic being sent on the given traffic channel.

Various parties proposed solutions to the above security problem. See, for example, U.S. Pat. No. 8,165,618 and U.S. Patent Pub. 2012/0213373 A1. However, the solution adopted for Release 10 of the 3GPP specifications is based on "selective" ciphering. The Third Generation Partnership Project (3GPP) Technical Specification (TS) detailing the selective ciphering solution is TS 44.018 V11.1.0 (2012-05), which is incorporated herein by reference.

In particular, Section 3.4.7a of 3GPP TS 44.018 stipulates that a GSM network may implement selective ciphering. If selective ciphering is implemented, the network will not cipher a SACCH data block—e.g., a block of data comprising a SACCH signaling message—if the SACCH data block contains any of the following Radio Resource (RR) messages: SI Type 5, SI Type 5bis, SI Type 5ter, SI Type 6, SI Type 14, Measurement Information, or an Extended Measurement Order. Conversely, the network will cipher the SACCH data block if it contains service access point identifier (SAPI) value 3 data (indicating Short Messaging Service or SMS data)—see 3GPP TS 44.006. Optionally, the SACCH data block is not ciphered if it carries a CP-ACK message—see 3GPP TS 24.011—which is used to acknowledge reception of a CP-DATA message.

Unfortunately, the receiving mobile station or other wireless device does not know in advance which type of SACCH data block is being received. Consequently, the wireless device does not know whether the received SACCH data block is ciphered or unciphered. 3GPP TS 44.018 proposes a solution for resolving such ambiguity at the user. The wireless device initially assumes that the received SACCH data block is deciphered, and then repeats decoding without deciphering if the initial decoding fails. However, this solution consumes significant processing resources, which increases power consumption and leaves less time for other tasks, such as making signal quality measurements, repeated message combining, etc.

SUMMARY

An example method of received signal processing at a wireless communication device includes demodulating a received communication signal and thereby obtaining soft bits as demodulation results. The method continues with comparing the demodulation results to a characteristic pattern that is indicative of the communication signal not being ciphered (encrypted) for transmission, and controlling whether the demodulation results are decoded with or without deciphering, based on said step of comparing.

A corresponding example device includes a wireless communication interface that is configured to receive communication signals transmitted from a wireless communication network, and one or more processing circuits that are associated with the wireless communication interface. The one or more processing circuits, which are simply referred to as "processing circuits" for convenience, are configured to demodulate a communication signal received through the wireless communication interface, and thereby obtain soft bits as demodulation results. The processing circuits are further configured to compare the demodulation results to a characteristic pattern that is indicative of the communication signal not being ciphered for transmission, and to control whether the demodulation results are decoded with or without deciphering, based on said step of comparing.

Selective deciphering of a received signal, as taught herein, provides a number of advantages, including greater efficiency through the elimination or at least reduction of wasted decoding cycles. The technique, such as practiced in a user equipment or a mobile station or other wireless communication device, capitalizes on the advantageous recognition herein that the demodulation results obtained for at least some types of received data blocks may be inspected or otherwise evaluated for characteristic patterns that are indicative of whether the data block was or was not ciphered for transmission. That evaluation informs the selective deciphering decision.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 is a diagram of known fixed data, such as may be included in a SACCH data block conveying System Information.

FIG. 8 is a diagram of example performance results obtained for example cases of the selective deciphering taught herein.

DETAILED DESCRIPTION

Figure 1:
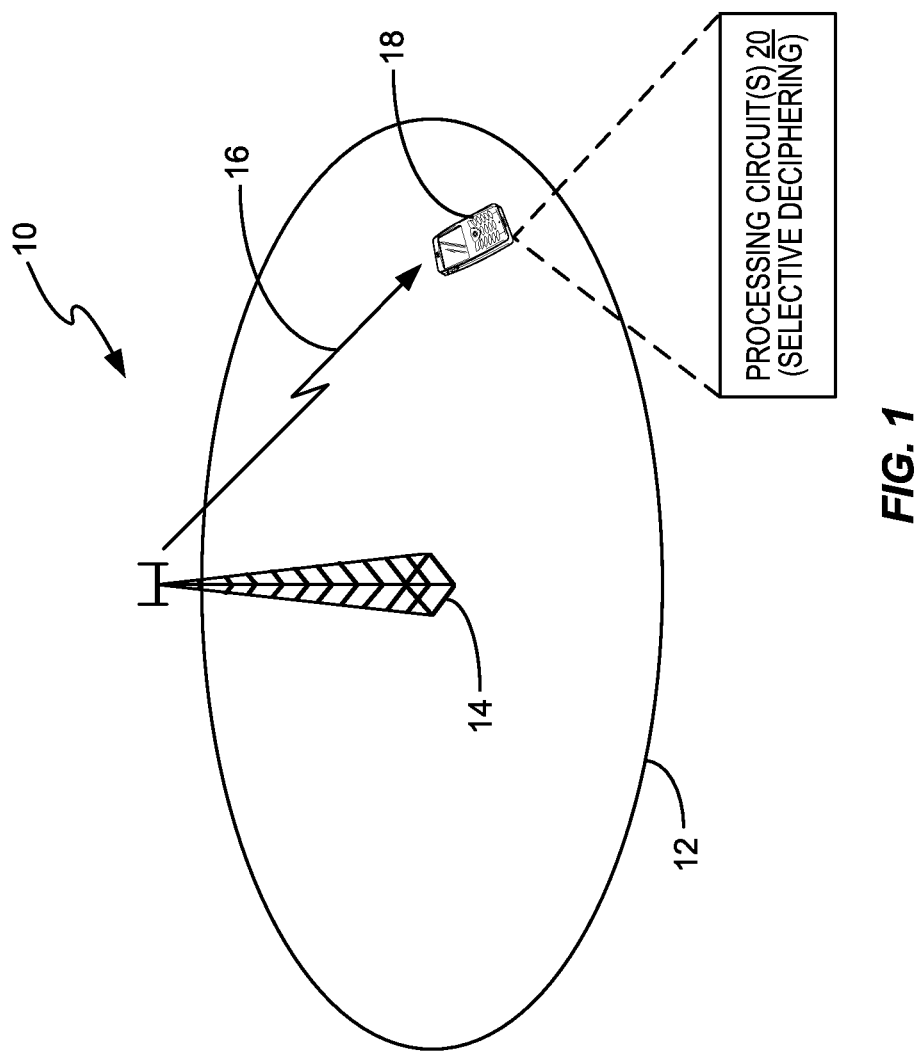
FIG. 1 is a partial block diagram of one embodiment of a wireless communication network.

FIG. 1 provides a simplified, partial illustration of a wireless communication network 10 that provides communication services within a cell 12, via a base station 14. While not intended as a limiting definition, the cell 12 may be regarded as the allocation or use of certain defined air interface (radio) resources within a certain coverage area. Further, the term "base station" should be given broad constructions, and it generally connotes a communication network node operating as a radio frequency transceiver.

In a non-limiting example, the wireless communication network 10 (hereafter "network 10") comprises a GSM network, and the network 10 may comprise many cells 12 and corresponding base stations 14. Of course, the network 10 may comprise another type of network, such as a Wideband CDMA network or a Long Term Evolution (LTE) network, and may further comprise other entities not illustrated—such as Core Network (CN) entities for device authorization, mobility management, and gateway services for communicating with devices or systems in other networks.

The depicted base station 14 transmits downlink signals 16, which are received by a wireless communication device 18. The base station 14 or the network 10 in general is configured to use "selective ciphering" for transmitting one or more types of the downlink signals 16. Thus, a given signal received by the wireless communication device 18 (hereafter "device 18") may or may not be ciphered. In a non-limiting example, the signals in question are Slow Associated Control Channel or SACCH transmissions.

Certain SACCH data blocks are transmitted without ciphering, e.g., the following system information or SI messages are not ciphered: Type 5, SI Type 5bis, SI Type 5ter, SI Type 6, SI Type 14, Measurement Information, or an Extended Measurement Order. Other types of SI messages are ciphered. Thus, in this example case, the device 18 receives some SI messages that are ciphered and some SI messages that are not ciphered, and does not know in advance which case applies. However, the device 18 includes one or more processing circuits 20 (hereafter "processing circuits 20") that are configured to perform selective deciphering as taught herein. With selective deciphering, the device 18 intelligently decides whether to perform decoding with deciphering or decoding without deciphering, based on evaluating the demodulation results obtained for the received signal in question. The signal may be a SACCH data block in a GSM embodiment, or another type of selectively-ciphered signal in embodiments involving other network types.

Here, "decoding with deciphering" will be understood to mean that the decoder operates on the demodulation results after deciphering processing has been applied to them. Correspondingly, "decoding without deciphering" means that the decoder operates on the demodulation results without deciphering processing having been applied to them, at least with respect to their use by the decoder.

Figure 2:
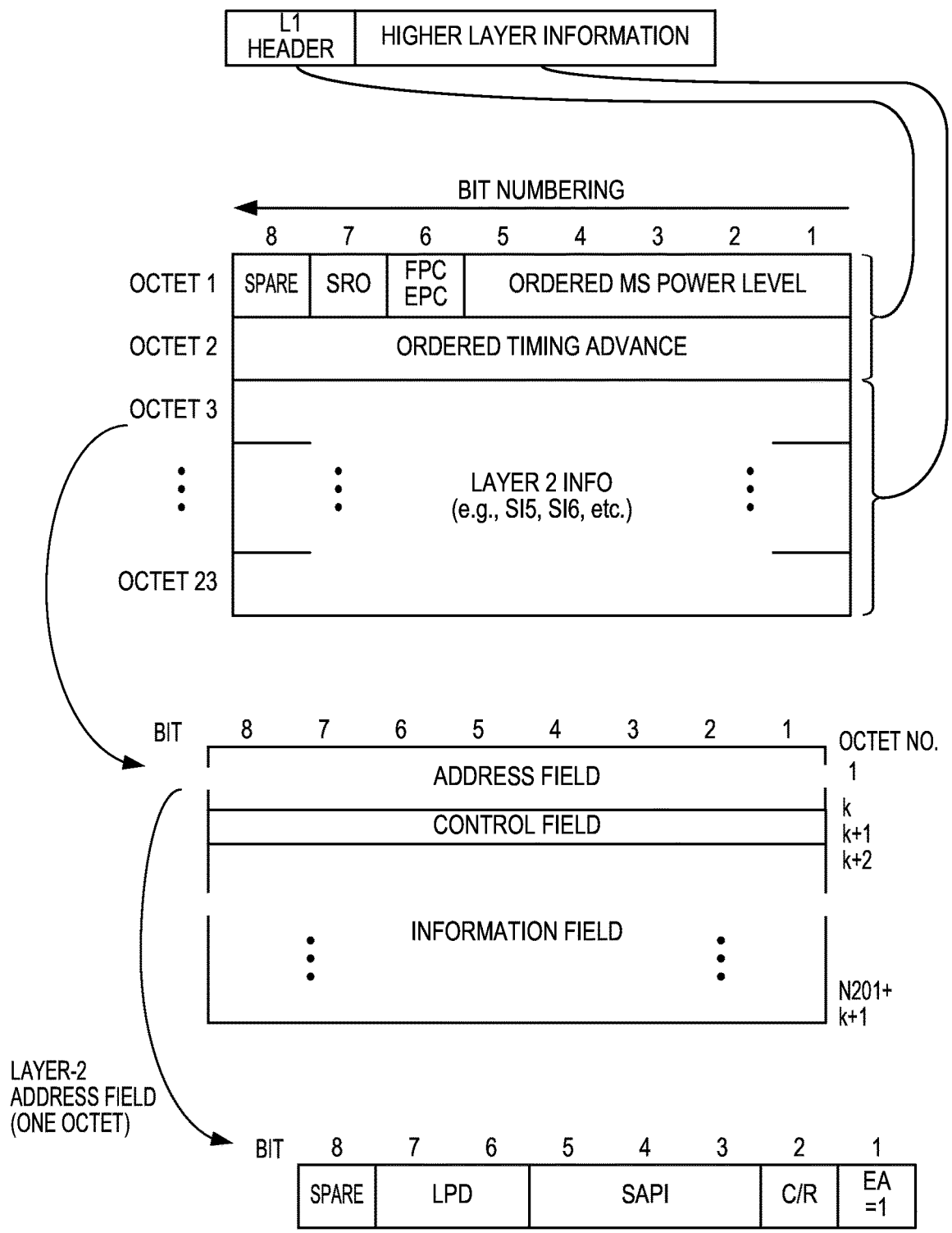
FIG. 2 is a diagram of a known signal structure for a Slow Associated Control Channel (SACCH) message, as transmitted in Global System for Mobile communications (GSM) networks.

Using the GSM embodiment to further this example discussion, FIG. 2 illustrates the block structure and content defined for 3GPP-compliant SACCH signaling message blocks. The downlink SACCH message generally contains 21 bytes of higher-layer information bits for Layer 2/Layer 3 (L2/L3) signaling, and then 2 bytes of header information added to it in Layer 1, for inserting the L1 specific information like Power control, Timing advance etc. However, the L2/3 information part varies, based on whether the SACCH is carrying SI or carrying SMS data. SMS data always will be transmitted with ciphering enabled, while SI may be transmitted using selective ciphering. The address field format of 8 bits (one octet), as defined in 3GPP TS 44.006 section 6.2, is shown at the bottom of FIG. 2. It includes Link Protocol Discriminator (LPD) bits, Command/response bit, Address field Extension (EA) bit and three SAPI bits that correspond to a SAPI field. If the 3 bits of the SAPI field are 000, it corresponds to SAPI value 0 and if the three bits are 011 it corresponds to SAPI value 3.

As defined in Section 6.3.3 of 3GPP TS 44.006, SMS is transmitted using service access point identifier (SAPI) value 3 (SAPI-3) and SI using SAPI value 0 (SAPI-0). The SAPI identifies a point at which data link layer services are provided by the data link layer to a layer 3 entity. SAPI value 0 is allocated for Call control signaling, mobility management signaling and radio resource management signaling including system information (SI), and SAPI value 3 is allocated for Short message service.

At the base station 14, 184 bits are input to the Physical (PHY) layer for physical layer processing. The 184 bits are encoded for transmission—where this encoding should not be confused with the ciphering at issue herein. In the context of physical layer encoding, 40 parity bits (generated using a binary cyclic code or a FIRE code) are added and 4 tail bits (all 4 bits are set to 0) are appended, for a total of 228 bits. These bits are then passed to a ½ rate convolution encoder, to generate 456 bits of encoded SACCH data, as described in Section 4.1.1 of 3GPP TS 45.003. Similarly, if the network supports enhanced the power control feature, the processing of SACCH data will be as described in section 4.11 (SACCH/TP) of 3GPP TS 45.003.

The above block is then interleaved (channelized for transmission) and ciphered if the block does not contain SI. If the block contains SI, it is not ciphered. Thus, the base station 14 can be understood as selectively ciphering the SACCH data block in question, based on whether the SACCH data block does or does not contain SI (or based on the type of SI contained in the block). Then 8 stealing bits are added, which are constant, resulting in a total of 464 bits for a single SACCH data block. The base station 14 forms four bursts using these 464 generated bits, which are then modulated and transmitted as downlink signals 16 to the device 18.

In the GSM example case, the device 18 receives these SACCH bursts and demodulates them to obtain demodulation results comprising 464 soft bits, corresponding to the 464 bits of the received SACCH data block. That is, there are 116 bits received per transmitted burst, and at total of four burst per transmitted SACCH data block. Note, too, as a non-limiting example, a "soft bit" here comprises a Log Likelihood Ratio (LLR) or other such value indicating the probability that the corresponding received bit was a "0" or a "1". Those skilled in the wireless communication arts will immediately understand the generation of soft bits based on received signal demodulation at the device 18.

Now, the positions of the encoded and interleaved bits comprising the SAPI-0 data sequence are known a priori to the device 18. In particular, FIG. 3 illustrates the fixed pattern in the SACCH data block received at the device 18 for the SACCH input data string including the 2-bytes of the L1 header] as "-0-00-011-11-XXX-X-XXX-0-..." for the SMS case, (Spare bit: 0, LPD: 00, SAPI: 011, C/R: 1, EA: 1) and the 2-bytes of the L1 header as "-0-00-000-11-000X-00-11-..." for the SI case (Spare bit: 0, LPD: 00, SAPI: 000, C/R: 1, EA: 1). Hence, the bit values in the SAPI field of 011 corresponds to SAPI value 3 and the SAPI bits 000 corresponds to SAPI value 0 as discussed in relation to FIG. 2. This fixed bit pattern after encoding will also result in another fixed bit pattern, and this remains true whether or not the network supports the power control feature (SACCH/TP).

These 15 bits—excluding the don't care bits—will appear in the demodulation results at known interleaving patterns and, because their values are known and fixed, they represent a characteristic pattern that will be present in the demodulation results obtained from any given SACCH data block received and demodulated at the device 18, for the case where the SACCH data block is an un-ciphered (not ciphered) SI message. Conversely, demodulation of a ciphered SACCH data block, e.g., a SACCH data block conveying SMS data, will not exhibit this characteristic pattern. In other words, the bit positions known at the device 18 representing the interleaved and encoded SAPI-0 data field will not exhibit the characteristic pattern known for such data and instead will be random.

With this in mind, in an example configuration, the device 18 is configured to evaluate the demodulation results obtained for a received SACCH data block at bit positions: 44, 130, 144, 197, 244, 297, 346, 395 and 446, within the 464 bit positions of the received SACCH data block. "Evaluation" here means determining whether the soft bit values at those locations match the expected values of the SAPI-0 data field. Here, "match" may connote a perfect, one-for-one matching, or may connote a degree or extent of matching, in which a match is declared if a certain number or percentage of the bit positions include bit soft values that are in agreement with the known values for those positions.

In this regard, and as will be further detailed, the device 18 may be configured to correlate certain ones of the soft bit values in a given set of demodulation results with a set of bit representing the characteristic pattern. If the correlation level meets at least a defined threshold level, the device 18 declares a match, meaning that the device 18 decides based on the correlation level as to whether the received SACCH data block comprises ciphered or un-ciphered data. Advantageously, if the device 18 decides that the SACCH data block comprises un-ciphered data, it decodes the demodulation results without deciphering—i.e., it does not apply deciphering processing to the demodulation results fed to the decoding processing. Such operation avoids the decoding failure that will invariably arise from decoding received data that has been deciphered after demodulation, when such data in fact was not ciphered by the base station 14 for transmission.

So, if a network does not support the "selective ciphering" feature, then the SACCH data block will always be ciphered, irrespective of whether it contain SI or SMS. In such case, deciphering will always be needed in the receiver side. The fixed bit pattern in the transmitter side will go through the ciphering unit and so, from the perspective of the receiver, the fixed data will be random and will not match with the soft-bit pattern template stored in the receiver side. As such, the de-ciphering unit will be invoked, according to the decision logic taught herein.

Figure 4:
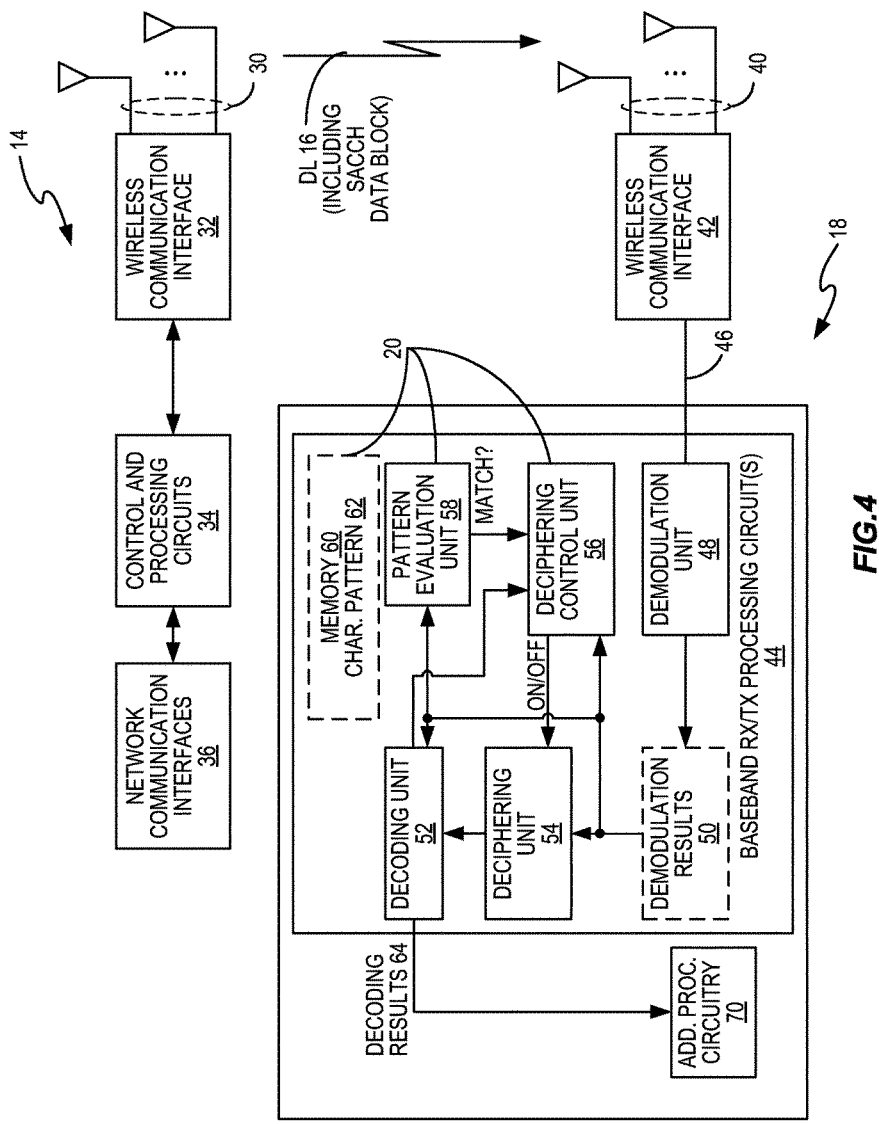
FIG. 4 is a block diagram of a wireless communication device, such as may be used in the network of FIG. 1.

FIG. 4 depicts an example base station 14 and an example device 18, which are configured for GSM operation in at least one embodiment, but which additionally or alternatively may be configured for other operation, such as LTE, WCDMA, etc. The depicted base station 14 includes one or more transmit/receive (TX/RX) antennas 30, a wireless communication interface 32—e.g., radiofrequency circuitry for modulation of signals for transmission, demodulation of received signals, frequency conversion, amplification, etc.

The base station 14 further includes control and processing circuits 34, which are operatively associated with the wireless communication interface 32 and which are configured for overall transmit signal generation, signaling control, received signal processing, etc., and which implement various signaling and control protocols. The control and processing circuits 34 are further associated with one or more network communication interfaces 36, e.g., for communicating with other base stations 14 and/or for communicating with various Core Network (CN) nodes, which are not illustrated in the diagram.

In general, the details of the base station 14 are not important with respect to the teachings herein, other than to note that the base station 14 transmits at least some downlink signals 16 using selective ciphering—e.g., given SACCH data block transmissions are or are not ciphered in dependence on the type of data being transmitted. Correspondingly, the device 18 includes the earlier-noted processing circuits 20, which provide selective deciphering functionality.

In terms of the overall depiction, which should be understood as a non-limiting example, the device 18 in FIG. 4 includes one or more TX/RX antennas 40, a wireless communication interface 42—e.g., a cellular radio transceiver—and one or more baseband RX/TX processing circuits 44, including a number of processing units representing one example of the device's processing circuits 20 shown in FIG. 1. While such circuits generally should be understood as providing transmit and receive signal processing and overall communication control and protocol processing with respect to the radio link between the device 18 and the network 10, only certain functional circuits that are particularly helpful in this discussion are illustrated.

In this regard, the baseband RX/TX processing circuits 44 are illustrated as receiving a received communication signal 46 from the wireless communication interface 42. The received communication signal 46 corresponds to antenna-received downlink signals 16, but may comprise a stream of digital samples obtained by filtering, amplifying, and downconverting the antenna-received downlink signals 16. Further, it will be understood that signal buffering is used within the device 18, e.g., the received communication signal 46 may be buffered in working memory for processing, and it will be understood that such buffering may be used for any one or more of the intermediate processing results obtained within the overall received signal processing chain represented by the baseband RX/TX processing circuits 44.

As regards those circuits, FIG. 4 depicts a demodulation unit 48, which produces demodulation results 50 from the received communication signal 46. These demodulation results 50 are decoded by a decoding unit 52, either with deciphering or without deciphering according to the selective deciphering method taught herein. Correspondingly, for decoding with deciphering, a deciphering unit 54 provides the decoding unit 52 with the demodulation results 50 after applying deciphering processing to them. For decoding without deciphering, the deciphering unit 54 passes the demodulation results 50 to the decoding unit 52 without first deciphering them. Equivalently, the decoding without deciphering may be understood as bypassing the deciphering unit 54, with the decoding unit 52 reading the demodulation results 50 from whatever buffer or store they are placed in by the demodulation unit 48.

Control for implementing the decision to decode with deciphering or without deciphering is provided by a deciphering control unit 56, which receiving characteristic pattern matching information from a pattern evaluation unit 58. In turn, the pattern evaluation unit 58 has access to a memory 60 or other store holding information representing a characteristic pattern 62 that is indicative of the received communication signal 46 not being ciphered by the base station 14 for transmission. The pattern evaluation unit 58 thus evaluates the demodulation results 50 with respect to the characteristic pattern 62 and provides an indication to the deciphering control unit 56 as to the extent or level of correlation between certain soft bit values in the demodulation results 50 and a set of bits comprising the characteristic pattern 62, which may comprise a set of bits representing known or fixed information that will be at known or fixed positions within the received communication signal 46 if ciphering was not applied to the received communication signal 46.

FIG. 4 also depicts the decoding unit 52 as producing decoding results 64, which are provided to additional processing circuitry 70. The additional processing circuitry 70 may include application-level processing circuitry, and may include one or more user interfaces, various input/output circuitry, etc., depending on the intended use of the device 18. In any case, it should be noted that the decoding results 64 may represent an initial decoding of the demodulation results 50 with or without deciphering, if the initial decoding is successful, or may represent the results of a subsequent, repeated decoding, if the initial decoding was not successful.

As for deciding whether to perform decoding at least initially with or without deciphering the demodulation results 50, in an example configuration, a given soft bit value will be considered to match its corresponding bit in the characteristic pattern 62 if, e.g., the sign of the soft bit value represents the correct pattern bit value. Evaluation optionally may further require that the magnitude of the soft bit value be above a defined confidence level.

Alternatively, the set of bits comprising the characteristic pattern 62 can be converted into the soft domain, for comparison with corresponding soft bits in the demodulation results 50. Further, the comparison may be made by making hard bit decisions on the certain soft bits in the demodulation results 50 and then comparing them with the corresponding bits in the set of bits representing the characteristic pattern 62.

As a further note, the term "unit" as used herein, such as "demodulation unit 48," "decoding unit 52," and so on, should be understood as denoting at least a functional circuit arrangement. For example, the various illustrated units may be implemented using fixed hardware circuits, or implemented in programmable processing circuits, or some combination of both.

Broadly, the device 18 comprises the aforementioned wireless communication interface which is configured to receive communication signals transmitted from the network 10, including selectively ciphered downlink signals 16. The device 18 further includes the baseband RX/TX processing circuits 44, which may be generally referred herein to as "one or more processing circuits 44," and which are configured to: demodulate a communication signal 46 received through the wireless communication interface 42, and thereby obtain soft bits as demodulation results 50; compare the demodulation results 50 to a characteristic pattern 62 that is indicative of the received communication signal 46 not being ciphered for transmission; and control whether the demodulation results 50 are decoded with or without deciphering, based on the comparison of the demodulation results 50 to the characteristic pattern 62.

In some embodiments, the one or more processing circuits 44 are configured to control whether the demodulation results 50 are decoded with or without deciphering, based on being configured to: decode the demodulation results 50 without deciphering, when there is at least a threshold correlation between certain soft bits in the demodulation results 50 and a set of bit values comprising the characteristic pattern 62; and otherwise decode the demodulation results 50 with deciphering. Further, in at least one embodiment, the one or more processing circuits 44 are configured to decode the demodulation results 50 with deciphering, if decoding the demodulation results 50 without deciphering fails.

Further, in at least some embodiments, the one or more processing circuits 44 are configured to obtain the characteristic pattern 62 by demodulating an earlier-received communication signal and saving soft bit values obtained therefrom. For example, the device 18 may receive certain data which it knows is received in un-ciphered form, and certain bits from that un-ciphered data can be saved or otherwise remembered as the characteristic pattern 62, to be used for later comparison with the demodulation results 50 obtained for a subsequent reception that may comprise the same data, or at least the same fixed information, at least for the case where the subsequent transmission is un-ciphered.

Additionally, or alternatively, the one or more processing circuits 44 are configured to obtain the characteristic pattern 62 from configuration data stored in the device 18. For example, the device 18 may be configured to use as its characteristic pattern 62 the fixed bit pattern used for the SAPI-0 data field for the transmission of a SI message in the GSM example case. More broadly, the one or more processing circuits 44 are configured to compare the demodulation results 50 to the characteristic pattern 62, based on being configured to compare the demodulation results 50 to a set of bit values corresponding to fixed or known data in the received communication signal 46. Thus, for the GSM example case, the received communication signal 46 comprises, for example, a received SACCH data block and the characteristic pattern 62 comprises one of: a characteristic pattern of bits that is known for a SAPI 0 field of SACCH data blocks that SI; or a characteristic pattern of bits that is known from a like SACCH data block earlier received at the device 18.

Figure 5:
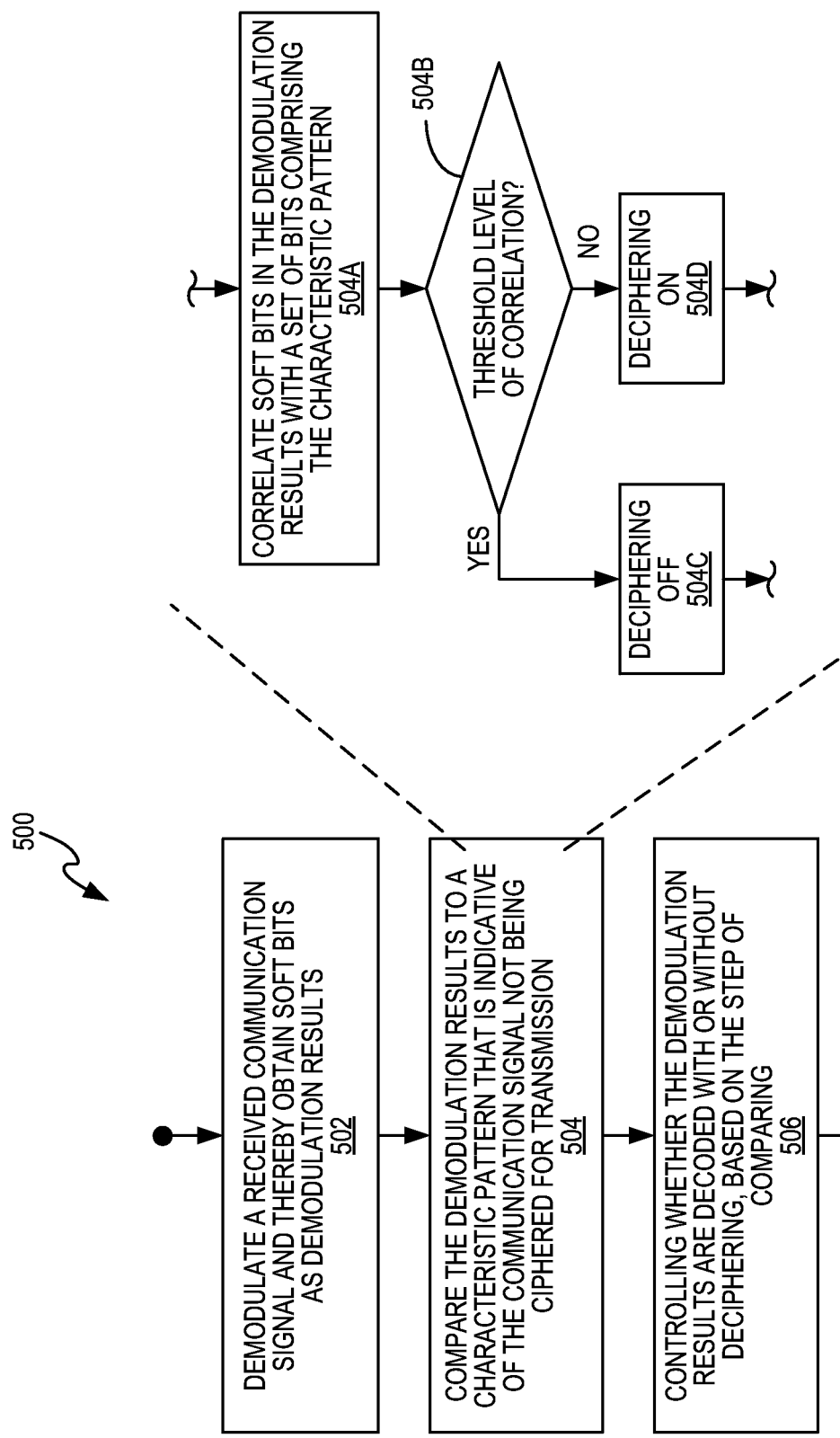
FIG. 5 is a logic flow diagram of one embodiment of a method at a wireless communication device of selectively deciphering a received communication signal before decoding, according to an example of the teachings herein.

FIG. 5 depicts an example method 500 that is consistent with the above-described device configuration of FIG. 4. The method 500 can be used in essentially any instance where a received signal may or may not comprise ciphered information, and where, for the unciphered case, there will be a characteristic pattern 62 of some sort exhibited by the demodulation results 50 obtained for the received communication signal 46.

The example method 500 thus can be understood as depicting advantageous received signal processing at the device 18, and it includes demodulating a received communication signal 46 and thereby obtaining soft bits as demodulation results 50 (Block 502), comparing the demodulation results 50 to a characteristic pattern 62 that is indicative of the communication signal 46 not being ciphered for transmission (Block 504); and controlling whether the demodulation results 50 are decoded with or without deciphering (Block 506), based on the step of comparing performed in Block 504.

The comparing step in Block 504 may comprise determining whether there is a matching between certain soft bits in the demodulation results 50 and a set of bits comprising the characteristic pattern 62. In some embodiments, for example, such matching determination comprises determining an extent or level of correlation between certain soft bit values in the demodulation results 50 and a set of bits comprising the characteristic pattern 62, based on correlating respective ones of the certain soft bits in the demodulation results 50 with corresponding ones of the bits in the characteristic pattern 62 (Block 504A). In the earlier example, certain bit positions in the demodulation results 50 correspond with fixed or known bit values; thus, the soft bits in those certain bit positions can be compared to see how well they match, e.g., in a collective or overall sense, with the known bit values comprising the characteristic pattern 62 (Block 504B, where "YES" denotes at least a threshold level of correlation).

If the demodulation results 50 exhibit the characteristic pattern 62 (YES from Block 504B), deciphering is "Off" (Block 504C) meaning that the demodulation results 50 are provided for decoding processing without first applying deciphering processing to them. If the demodulation results 50 do not exhibit the characteristic pattern 62 (NO from Block 504B), deciphering is "On" (Block 504D), meaning that the demodulation results 50 are provided for decoding processing after first applying deciphering processing to them. Thus, the method 500 controls whether the demodulation results 50 are decoded with or without deciphering by controlling whether the demodulation results 50 are input to a decoding unit 52 with or without processing by a deciphering unit 54.

Figure 6:
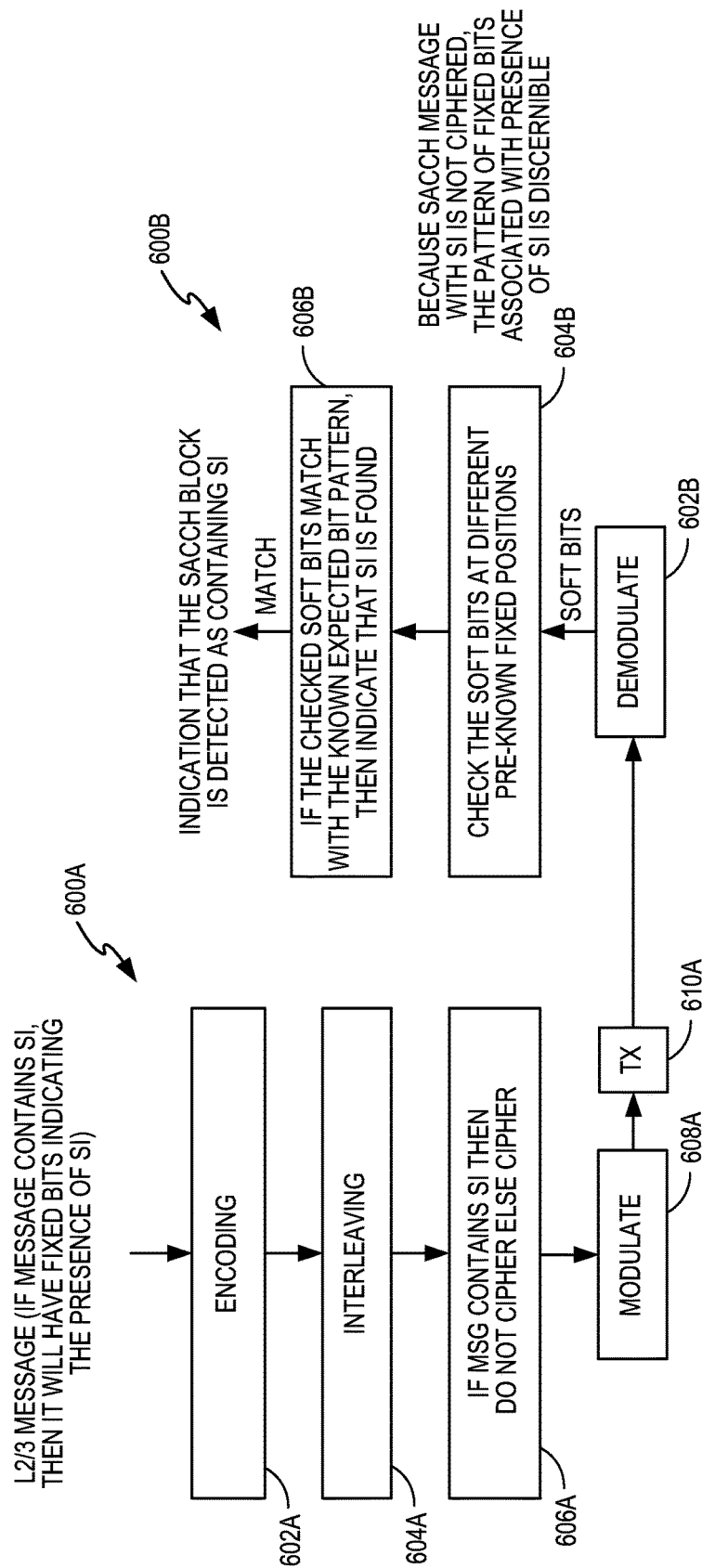
FIG. 6 is a logic flow diagram showing one embodiment of known network-side transmit processing in correspondence with another example of the device-side received signal processing taught herein.

FIG. 6 provides a further example of selective ciphering at the transmitter side and selective deciphering at the receiver side of a network 10 of FIG. 1, where the method 600A comprises steps or actions 602A, 604A, 606A, 608A and 610A, occurring at the base station 14 or other such network node transmitter. The method 600B comprises steps or actions 602B, 604B and 606B, occurring at the device 18.

The method 600A represents known processing on the network node side, whereas the method 600B can be understood as a further, albeit partial, embodiment of the method 500 of FIG. 5 of selective deciphering at the device 18. The method 600B includes demodulating the received communication signal 46 (Block 602B), and checking the soft bits at different positions in the demodulation results 50, which are known to correspond to fixed or known data (Block 604B). If the soft bits at those positions match the expected bit values comprising the characteristic pattern 62, then generate an indication of such matching (Block 606B), e.g., generate a flag or signal to skip deciphering before decoding the demodulation results 50.

Figure 7:
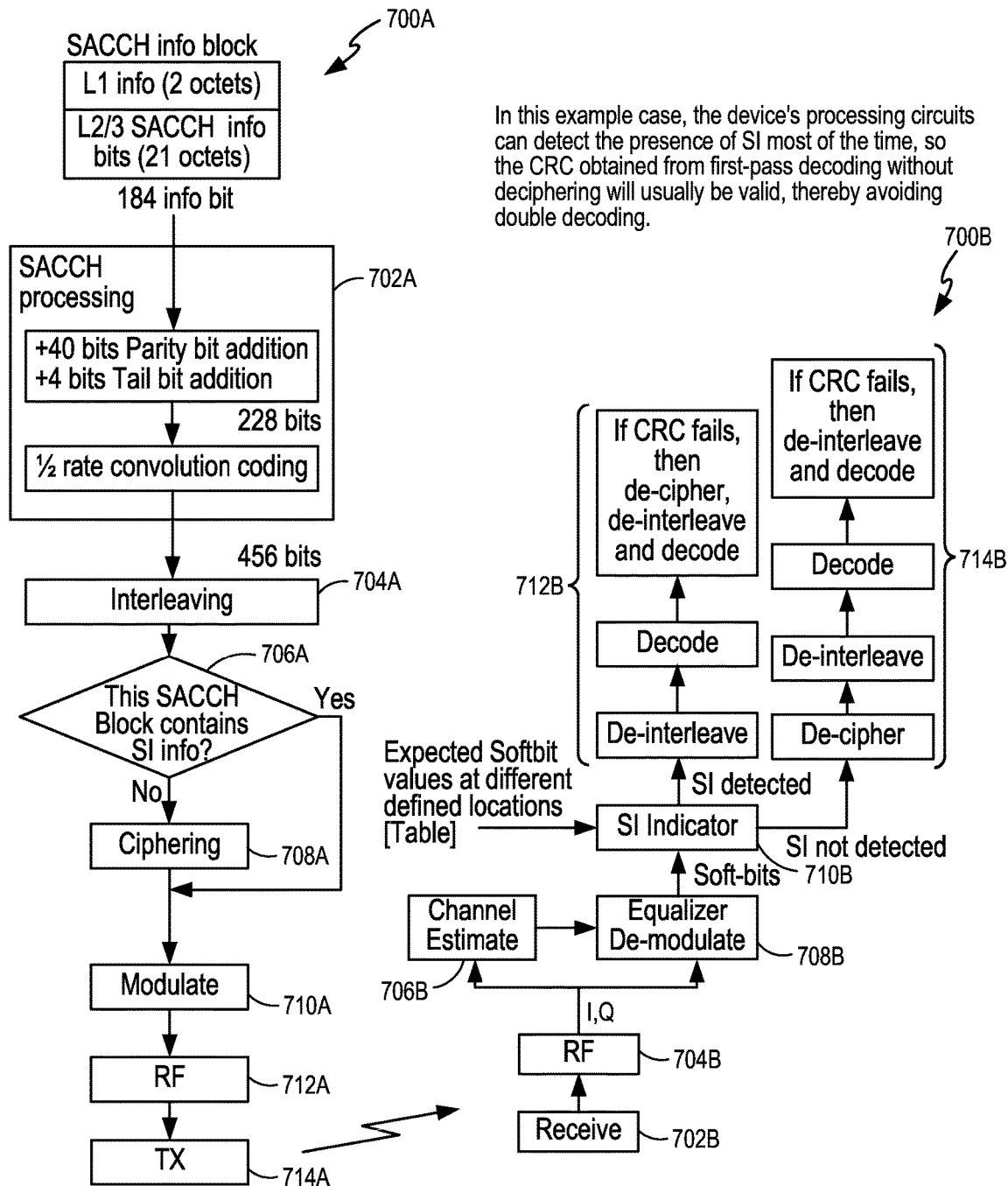
FIG. 7 is a logic flow diagram showing further details for a known network-side transmit processing in correspondence with another example of the device-side received signal processing taught herein.

FIG. 7 presents further example details for a transmit-side method 700A and a receive-side method 700B, which again can be considered as comprising example details for the method 500 introduced in FIG. 5.

Transmit-side (network node-side) processing is illustrated as comprising known steps or actions 702A-714A. Of interest, one sees selective ciphering performed in Steps 706A and 708A, wherein the SACCH data block is not ciphered if it contains SI information.

On the receive-side (device-side), the method 700B includes receiving the transmitted signal (Block 702B) and performing initial radiofrequency front-end processing (Block 704B) to obtain the earlier-discussed communication signal 46, which may comprise in-phase (I) and quadrature (Q) components in a stream of digitized waveform samples.

Processing further includes channel estimation (Block 706B) and demodulation (708B), which may comprise equalization processing, as is known in the wireless communication arts. Such processing produces soft bits comprising the demodulation results 50, which are then evaluated against expected soft bit values at know positions or locations within the demodulation results 50 (Block 710B), to see whether SI is or is not detected. Such processing can be understood as a specific example of determining whether the demodulation results 50 exhibit a characteristic pattern 62 that is indicative of the communication signal 46 not being ciphered for transmission. More particularly, detecting SI in this case can be understood as detecting the fixed data known for SACCH data blocks that carry SI.

If SI is detected for the demodulation results 50, processing continues with decoding without deciphering (Block 712B), which includes de-interleaving the demodulation results 50, decoding the de-interleaved demodulation results 50, and then checking whether decoding is successful, e.g., by performing a Cyclic Redundancy Check (CRC) on the decoding results. If the CRC check fails, the one or more processing circuits 44 assume that deciphering should have been applied to the demodulation results despite those results exhibiting the characteristic pattern 62. Thus, the one or more processing circuits 44 go back and decipher the demodulation results 50, then de-interleave the deciphered demodulation results 50, and then decode the deciphered, de-interleaved demodulation results 50.

If SI is not detected, processing continues from Block 710B with the processing of Block 714B, which includes deciphering the demodulation results 50, de-interleaving the deciphered demodulation results 50, and then decoding the deciphered, de-interleaved demodulation results 50. Here, if decoding fails, the device 18 assumes that deciphering should not have been applied to the demodulation results 50 for decoding, even though SI was not detected—i.e., even though the one or more processing circuits 44 did not detect the characteristic pattern 62 in the demodulation results 50. Thus, the one or more processing circuits 44 de-interleave the demodulation results 50, while skipping deciphering, and decode the de-interleaved demodulation results 50.

In a sense then, one or more embodiments of the device 18 implement processing that allows the device 18 to recover from an incorrect decision as to whether the communication signal 46 was or was not ciphered. If the device 18 determines that the communication signal 46 was not ciphered and decodes without deciphering, it will repeat decoding with deciphering if the initial decoding without deciphering fails. Conversely, if the device 18 determines that the communication signal 46 was ciphered and decodes with deciphering, it will repeat decoding without deciphering if the initial decoding with deciphering fails.

However, the ciphered/not-ciphered decision-making taught herein can easily be configured to be reliable. See, for example, the table shown in FIG. 8. Consider only three bits of SAPI-0 and SAPI-3 identification—i.e., taking first two bytes of the L2/3 message information in a SACCH data block conveying SI. This approach leads to nine soft bit positions out of the total 464 bits positions when the demodulation results 50 are for a received SI message.

The illustrated table in FIG. 8 indicates that all nine soft bit sign values match 100% of the time for any GSM SI message of Type 5, 5ter, 5bis, or 6, for a static-type propagation channel and a Received Signal Strength Indicator (RSSI) of −105 dBm (SINR=6 dB). Even for RSSI=−110 dBm (SINR=1 dB), the soft bit sign values will match the expected pattern 90% of the time.

As noted, the expected values comprising the characteristic pattern 62 may comprise known or fixed data used in certain types of transmissions. Further, the device 18 can be configured to store the entire soft bit pattern from decoding earlier-received SI, and use that stored information for evaluating a later-received SI message. The comparison value, e.g., a soft-bit sign correlation value, is checked against a threshold value, and decision about the match is made. If the demodulation results 50 of the subsequent message match the stored soft bit information, the device 18 decides that the subsequent message also includes SI information. The threshold may be set dynamically, e.g., using the incidence of decoding failures to raise or lower the threshold. Alternatively, the threshold may be fixed, e.g., to require an 80% match or a 90% match. Additionally, the threshold may default to a starting value and the device 18 then adjusts the threshold up or down, e.g., based on the frequency or occurrence of decoding failures when the device 18 decides to initially decode without deciphering.

Also, as noted, the teachings herein can be applied to wireless network types other than GSM. Such systems may transmit some information content sent as clear text on a broadcast channel, and will send the same information as ciphered text on one or more other channels.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of received signal processing at a wireless communication device comprising:
    demodulating a received communication signal comprising data block of ciphered or un-ciphered data and thereby obtaining a plurality of soft bits as demodulation results;
    obtaining a characteristic pattern of bit values from configuration data stored in the wireless communication device;
    comparing soft bit values at predetermined positions of the obtained plurality of soft bits to the characteristic pattern of bit values that is indicative of the communication signal not being ciphered for transmission; and
    based on said step of comparing, decoding the demodulation results either with or without deciphering.

2. The method of claim 1, wherein decoding the demodulation results either with or without deciphering comprises:
    decoding the demodulation results without deciphering, when there is at least a threshold correlation between the soft bit values at the predetermined positions and the bit values comprising the characteristic pattern; and
    otherwise decoding the demodulation results with deciphering.

3. The method of claim 2, further comprising performing a second decoding of the demodulation results with deciphering, if decoding the demodulation results without deciphering fails.

4. The method of claim 1, wherein the characteristic pattern is further obtained by demodulating an earlier-received communication signal and saving the soft bit values obtained therefrom.

5. The method of claim 1, wherein said comparing comprises comparing the demodulation results to a set of bit values corresponding to fixed or known data in the communication signal.

6. The method of claim 1, wherein the communication signal comprises a received Slow Associated Control Channel (SACCH) data block and wherein the characteristic pattern comprises one of:
    a characteristic pattern of bits that is known for a Service Access Point Identifier (SAPI) field of SACCH data blocks that convey System Information (SI); or
    a characteristic pattern of bits that is known from a like SACCH data block earlier received at the wireless communication device.

7. The method of claim 1, wherein said comparing comprises determining an extent or level of correlation between the soft bit values at the predetermined positions and the bit values comprising the characteristic pattern, and wherein controlling whether the demodulation results are decoded with or without deciphering comprises controlling whether the demodulation results are input to a decoding unit with or without processing by a deciphering unit.

8. A wireless communication device comprising:
    a wireless communication interface configured to receive communication signals transmitted from a wireless communication network; and
    one or more processing circuits configured to:
        demodulate a received one of communication signals comprising data block of ciphered or un-ciphered data received through the wireless communication interface, and thereby obtain a plurality of soft bits as demodulation results;

obtain a characteristic pattern of bit values from configuration data stored in the wireless communication device;

compare soft bit values at predetermined positions of the obtained plurality of soft bits to the characteristic pattern of bit values that is indicative of the communication signal not being ciphered for transmission; and based on the comparison of the demodulation results to the characteristic pattern, decode the demodulation results either with or without deciphering.

9. The wireless communication device of claim 8, wherein the one or more processing circuits are configured to decode the demodulation results either with or without deciphering, based on being configured to:

decode the demodulation results without deciphering, when there is at least a threshold correlation between the soft bit values at the predetermined positions and the bit values comprising the characteristic pattern; and otherwise decode the demodulation results with deciphering.

10. The wireless communication device of claim 9, wherein the one or more processing circuits are configured to decode the demodulation results with deciphering, if decoding the demodulation results without deciphering fails.

11. The wireless communication device of claim 8, wherein the one or more processing circuits are further configured to obtain the characteristic pattern by demodulating an earlier-received communication signal and saving the soft bit values obtained therefrom.

12. The wireless communication device of claim 8, wherein the one or more processing circuits are further configured to compare the demodulation results to a set of bit values corresponding to fixed or known data in the communication signal.

13. The wireless communication device of claim 8, wherein the communication signal comprises a received Slow Associated Control Channel (SACCH) data block and wherein the characteristic pattern comprises one of:

a characteristic pattern of bits that is known for a Service Access Point Identifier (SAPI) field of SACCH data blocks that convey System Information (SI); or a characteristic pattern of bits that is known from a like SACCH data block earlier received at the wireless communication device.

14. The wireless communication device of claim 8, wherein the one or more processing circuits comprise:

a demodulation unit that is configured to obtain the demodulation results by demodulating the communication signal;

a decoding unit that is configured to decode the demodulation results either without first deciphering the demodulation results, or with first deciphering the demodulation results;

a deciphering unit that is configured to decipher the demodulation results so that the demodulation results can be decoded with deciphering; and a deciphering control unit that is configured to control whether the decoding unit operates on the demodulation results with or without deciphering, based on a matching indication from a pattern evaluation unit that is configured to determine an extent or level of correlation between the soft bit values at the predetermined positions and the bit values comprising the characteristic pattern.

15. A method of received signal processing at a wireless communication device comprising:

demodulating a received communication signal comprising data block of ciphered or un-ciphered data and thereby obtaining a plurality of soft bits as demodulation results;

comparing soft bit values at predetermined positions of the obtained plurality of soft bits to a characteristic pattern of bit values that is indicative of the communication signal not being ciphered for transmission, wherein said comparing further comprises comparing the demodulation results to a set of bit values corresponding to fixed or known data in the communication signal; and based on said step of comparing, decoding the demodulation results either with or without deciphering.

* * * * *